US012045601B1

(12) United States Patent
Fortenberry et al.

(10) Patent No.: US 12,045,601 B1
(45) Date of Patent: Jul. 23, 2024

(54) SYSTEMS AND METHODS FOR DYNAMIC DATA MANAGEMENT

(71) Applicant: APPLE INC., Cupertino, CA (US)

(72) Inventors: Thaddeus S. Fortenberry, Dripping Springs, TX (US); Jonathan P. Gardner, Austin, TX (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/684,003

(22) Filed: Mar. 1, 2022

Related U.S. Application Data

(60) Provisional application No. 63/154,999, filed on Mar. 1, 2021.

(51) Int. Cl.
| | | |
|---|---|---|
| *H04W 4/40* | (2018.01) | |
| *G06F 8/65* | (2018.01) | |
| *H04W 4/44* | (2018.01) | |
| *B60W 50/00* | (2006.01) | |
| *G06F 8/70* | (2018.01) | |
| *G06F 11/30* | (2006.01) | |
| *H04W 4/48* | (2018.01) | |

(52) U.S. Cl.
CPC ............... *G06F 8/65* (2013.01); *B60W 50/00* (2013.01); *B60W 2050/0083* (2013.01); *G06F 8/70* (2013.01); *G06F 11/3013* (2013.01); *H04W 4/44* (2018.02); *H04W 4/48* (2018.02)

(58) Field of Classification Search
CPC .......... G06F 8/65; G06F 8/70; G06F 11/3013; H04W 4/44; H04W 4/48
See application file for complete search history.

(56) References Cited

U.S. PATENT DOCUMENTS

| | | | |
|---|---|---|---|
| 10,007,513 B2 | 6/2018 | Malladi et al. | |
| 10,917,808 B2* | 2/2021 | Nagamura | .............. H04W 4/40 |
| 10,976,962 B2 | 4/2021 | Karumbunathan et al. | |
| 11,128,045 B2 | 9/2021 | Tran et al. | |
| 11,288,156 B2* | 3/2022 | Ogawa | ...................... G06F 1/32 |
| 11,395,313 B2* | 7/2022 | Bharadwaj | ............ H04L 5/0055 |
| 11,659,370 B2* | 5/2023 | Lee | ........................ H04W 4/50 |
| | | | 370/329 |
| 2019/0265965 A1* | 8/2019 | Acharya | ................. H04L 12/40 |
| 2019/0369984 A1 | 12/2019 | Malladi et al. | |

(Continued)

OTHER PUBLICATIONS

Samy Faddel et al., Automated Distributed Electric Vehicle Controller for Residential Demand Side Management, 2019, [Retrieved on Feb. 2, 2024]. Retrieved from the internet: <URL: https://ieeexplore.ieee.org/stamp/stamp.jsp?tp=&arnumber=8440722> 10 Pages (16-25) (Year: 2019).*

*Primary Examiner* — Anibal Rivera
(74) *Attorney, Agent, or Firm* — Polsinelli PC

(57) ABSTRACT

Implementations described herein provide systems and methods for data management for a plurality of source devices. In one implementation, a policy profile is obtained for data management in a hierarchical environment associated with the source devices. The policy profile includes an action and a priority level. The policy profile is published downstream in the hierarchical environment, and the policy profile deployed at one or more source devices of the plurality of source devices in the hierarchical environment. Data is communicated from the one or more source devices upstream in the hierarchical environment according to the action and the priority level of the policy profile.

20 Claims, 8 Drawing Sheets

(56) References Cited

U.S. PATENT DOCUMENTS

| | | |
|---|---|---|
| 2019/0386969 A1 | 12/2019 | Verzun et al. |
| 2020/0134207 A1 | 4/2020 | Doshi et al. |
| 2021/0144517 A1 | 5/2021 | Guim Bernat et al. |
| 2021/0192867 A1* | 6/2021 | Fang ................ G07C 5/008 |

* cited by examiner

SYSTEMS AND METHODS FOR DYNAMIC DATA MANAGEMENT

CROSS-REFERENCE TO RELATED APPLICATIONS

The present application claims priority to U.S. Provisional Patent Application No. 63/154,999 filed on Mar. 1, 2021, which is incorporated by reference in its entirety herein.

FIELD

Aspects of the present disclosure relate to systems and methods for appropriate data collection and software deployment and more particularly to high value data ingest through prioritized data collection at endpoints.

BACKGROUND

Devices, such as mobile devices, can upload and download vast amounts of data. Cloud environments are utilized to provide data to such devices, as well as to ingest data from such devices. However, cloud computing environments are challenged by scalability and efficiency. As the number of connected devices and the amount of data communicated to and from the cloud by each device increase, data processing becomes time consuming and burdensome.

SUMMARY

Implementations described and claimed herein address the foregoing problems by providing systems and methods for data management for a plurality of source devices. In one implementation, a policy profile is obtained for data management in a hierarchical environment associated with the source devices. The policy profile includes an action and a priority level. The policy profile is published downstream in the hierarchical environment, and the policy profile deployed at one or more source devices of the plurality of source devices in the hierarchical environment. Data is communicated from the one or more source devices upstream in the hierarchical environment according to the action and the priority level of the policy profile.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
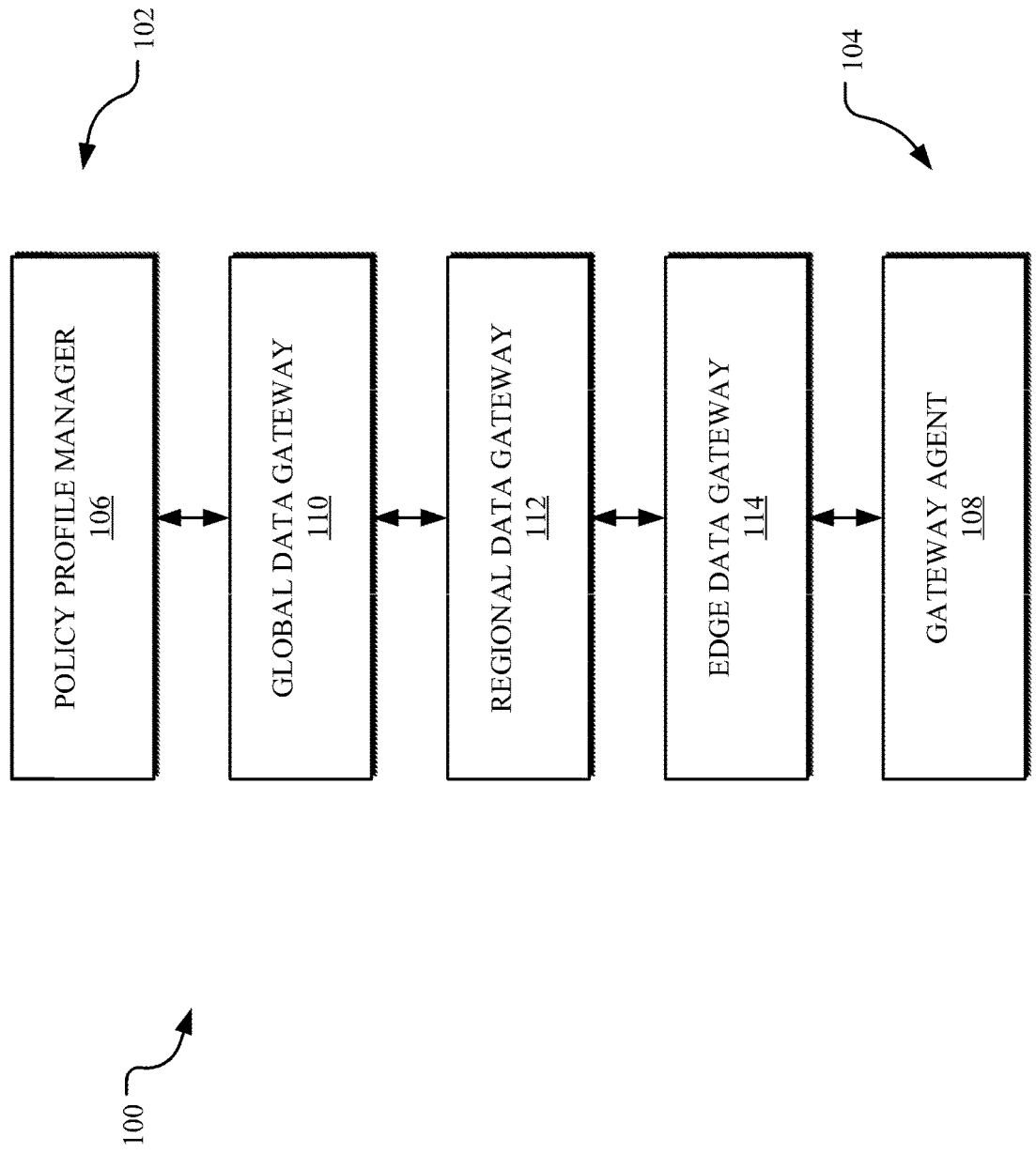
FIG. 1 is a diagram of an example managed infrastructure for optimized data management in an end-to-end pipeline including a plurality of devices, such as mobile devices.

Aspects of the presently disclosed technology relate to systems and methods for data management for a plurality of devices, such as mobile devices. Generally, a managed infrastructure for optimized data handling includes a policy profile manager and the plurality of devices deployed in an end-to-end data pipeline. The plurality of devices are each endpoints in the data pipeline that are sources of the data within the managed infrastructure. The policy profile manager controls data transfer and software deployment at various connection points within the managed infrastructure. The managed infrastructure provides customizable data handling within a flexible environment that may be configured to meet a variety of requirements at different connection points within the end-to-end data pipeline. The managed infrastructure may be secure, authenticated, encrypted, unsecured, unauthenticated, unencrypted, and/or the like accordingly.

In one aspect, one or more data gateways running on a variety of appliances and container configurations in a hierarchy within the managed infrastructure form a purpose built environment for data upload and download (e.g., software deployment). As the data gateways are enabled, distributed and upgradable data value settings, collection criteria, and response actions are leveraged using one or more policy profiles, which may be dynamic policy profiles and/or static policy profiles. The policy profiles are created and synchronized with appropriate hierarchical gateways in the managed infrastructure with secure communications. During device operation, dynamic events are flagged as a priority level defined by a local criteria table corresponding to the policy profile. The local criteria table is updatable using the policy profile to support changing priorities. Thus, the policy profiles facilitate rapid identification and upload of critical data, thereby supporting appropriate and scalable data collection, training refinement, new environment mapping, and/or the like to accommodate an increase in a number of devices and associated bandwidth and processing requirements. Stated differently, as opposed to the practice of ingesting all data for processing to identify specific data, the policy profiles enable selective collection of data for appropriate functions at the source.

The various systems and methods disclosed herein generally provide for data management within a managed infrastructure including a plurality of source devices. The managed infrastructure establishes and applies systemic data values by managing an end-to-end pipeline of the managed infrastructure with a policy profile manager. Data value may generally correspond to a relevance, cost, and/or timeliness of data in connection with a particular action, task, objective, request, target, time, and/or the like. It will be appreciated by those skilled in the art, however, that a characterization of data value is customizable based on numerous factors associated with the managed infrastructure to increase a rate of high-value data ingest and proactively eliminate or otherwise reduce low value data transfers. It will be further appreciated that the presently disclosed technology is applicable to various types of endpoints, including but not limited to mobile devices, smartphones, tablets, laptops, wearables, personal computers, workstations, terminals, multimedia consoles, televisions, speakers, robots, aerial vehicles, aerospace vehicles, submersible vehicles, ground vehicles, personal vehicles, user devices, and/or other computing devices and machines. In some examples herein, the implementations are described with respect to a plurality of such devices.

To begin a detailed description of an example managed infrastructure 100 for optimized data management in an end-to-end pipeline, reference is made to FIG. 1. The managed infrastructure 100 generally provides a scaled management for an end-to-end data pipeline. The managed infrastructure 100 may provide unified gateway management across the pipeline. In one implementation, the managed infrastructure 100 includes a hierarchical environment including a plurality of levels stacked in the end-to-end pipeline from a first level 102 to a last level 104, with one or more intermediate levels. The last level 104 may be associated with endpoints as an initial level in the hierarchical environment for upload and a final level in the hierarchical environment for download. Such endpoints may include various types of source devices, such as mobile devices (e.g., a fleet of vehicles). In the hierarchical environment, the last level 104 is downstream from other levels, and the first level 102 is upstream from other levels. The hierarchical environment may be a hierarchical gateway environment with one or more gateway levels.

In one implementation, the managed infrastructure 100 includes a policy profile manager 106 managing data within the hierarchical environment across one or more levels forming a purpose built environment for selective data collection and software deployment under appropriate conditions. The hierarchical environment includes one or more data gateways. The data gateway runs on a variety of appliances and container configurations within the hierarchical environment of the managed infrastructure 100. As such, the data gateway provides hierarchical device connectivity options, compute resources for processing and analysis, storage to cache data, and software deployment. The hierarchical device connectivity options may include connection speed, connection type (e.g., wired, wireless, etc.), connection window (e.g., time of day, within a period of time, etc.), and/or the like. The software may be directed towards deterministic processing, automation for data and systems management, and/or the like.

The data gateways may run in singular or in series within the managed infrastructure 100 according to one or more policy profiles (e.g., dynamic policy profiles and/or static policy profiles). In one implementation, the policy profile manager 106 generates the policy profiles and publishes the policy profiles downstream to one or more intermediate levels and/or the source devices. The intermediate levels may include a global level, a regional level, and an edge level. The global level may be associated with an entirety of the source devices. The regional level may be associated with one or more regions in which a subset of the source devices operate. For example, the one or more regions may include one or more continents, countries, territories, states, municipalities, counties, cities, neighborhoods, and/or other predefined areas or paths. The source devices may be mobile devices that move across the one or more regions. The edge level includes a plurality of ingress/egress points connecting the source devices to a network of the managed infrastructure 100. As such, the source devices may be connected to upstream services of the hierarchical environment via the edge level.

In one implementation, the policy profile manager 106 is associated with the first level 102, and the last level 104 is associated with the source devices as endpoints. Each source device may include a gateway agent 108 that communicates data upstream to the policy profile manager 106 via data gateways, such as an edge data gateway 114, a regional data gateway 112, and a global data gateway 110, associated with one or more of the intermediate levels. The policy profile manager 106 may publish policy profiles for data management downstream to one or more of the data gateways 110-114 associated with the intermediate levels and the gateway agent 108 as an endpoint. It will be appreciated that the devices of the managed infrastructure 100 may communicate, directly or indirectly, with each other upstream and downstream to one or more levels within the stack of the end-to-end data pipeline of the hierarchical environment. Additionally, it will be appreciated that additional levels and associated devices may be added or removed according to scaling of the managed infrastructure 100.

Each data gateway 108-114 may work with other data gateways to share workloads and provide redundancy for services and data protection. The data gateways 108-114 may further operate as a buffer to upstream services within the hierarchical environment based on an upstream buffer threshold. The upstream buffer threshold may include an availability threshold corresponding to an availability of an upstream service deployed within the hierarchical environment, a performance threshold corresponding to one or more performance parameters of the upstream service, and/or the like. Additionally, the data gateways 108-114 utilize the policy profiles in conducting universal data value tagging for prioritization, optimized data transfer within the managed infrastructure 100, edge processing, and/or the like. The optimized data transfer may correspond to time, cost, relevancy, and/or other transfer parameters.

The data gateways 108-114 of the managed infrastructure 100 enforce or otherwise apply data values across the hierarchical environment using the one or more policy profiles. Through the application of the policy profiles, one or more levels within the managed infrastructure 100 exchange data, including sending data to and receiving data from, source devices. In general, data has a measurable value, or usefulness, corresponding to relevance, cost, and/or timeliness of data in connection with a particular action, task, objective, request, target, time, and/or the like. The value of data changes depending on a number of factors within the managed infrastructure 100. The policy profile manager 106, including one or more devices, may provide a single point of management for applying data values and related priorities and response actions downstream within the managed infrastructure 100. Overall, the policy profile manager 106 dynamically and rapidly adjusts the data values along with related priorities and response actions at one or more of the levels using a dynamic policy profile.

Figure 2:
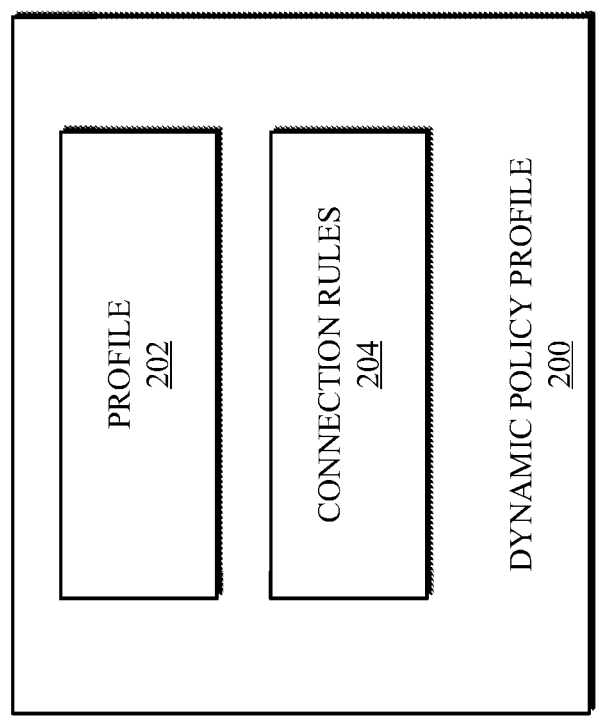
FIG. 2 illustrates an example dynamic policy profile.

Referring to FIG. 2, an example dynamic policy profile 200 is illustrated. While the examples described herein reference a dynamic policy profile, it will be appreciated that the managed infrastructure 100 may utilize static policy profiles, other types of policy profiles, and/or a combination thereof. As can be understood from FIGS. 1-2, the dynamic policy profile 200 may be used to define rules for handling data at one or more levels of the manage infrastructure 100 based on gateway conditions at the one or more levels, such as gateway environment, gateway hardware, gateway location, and/or the like. In one implementation, the policy profile manager 106 provides centralized management of distributed, hierarchical gateways (e.g., the data gateways 108-114) through downstream publication of the dynamic policy profile 200. Generation and publication of data handling policies using the dynamic policy profile 200 generally supports diverse environments of the managed infrastructure 100 and reduces connectivity costs, streamlines evolving conditions, and rapidly adjusts data value, while facilitating scaling through automation and management at the data gateways 108-114.

In one implementation, the data gateways 108-114 are deployed in the hierarchical environment according to capacity with the dynamic policy profile 200 defining rules for data handling based on gateway parameters, such as environment, hardware, network, location, load, and/or the like. The data gateways 108-114 are managed as caching gateways within the managed infrastructure 100 using the dynamic policy profile 200. The data gateways 108-114 may be managed through various customizable caching functions, rules, and/or parameters. Such caching may be bidirectional, unidirectional, and/or the like.

The dynamic policy profile 200 may be generated as a table, a binary, a text file, an object notation configuration (e.g., a JavaScript Object Notation (JSON)), a database entry, and/or other instruction format configured to deploy a policy for data management with an associated time, priority, and criteria at one or more of the gateways 108-114. In one implementation, the dynamic policy profile 200 includes a profile 202 and connection rules 204. The profile 202 may include a machine identifier, a hierarchical level, a hardware profile, a storage profile, a network connection in, a network connection out, comments, and other profile parameters. The machine identifier identifies a specific data gateway in the managed infrastructure 100 for deploying the dynamic policy profile 200, and the hierarchical level corresponds to a tier (e.g., global, regional, edge, agent, etc.) within the hierarchy of the managed infrastructure 100 at which the dynamic policy 200 is deployed. The connection rules 204 may similarly include a machine identifier and comments. In some implementations media access control addresses (MAC address) or unique identifiers (UIDs) are used as machine identifiers.

Using the profile 202 and the connection rules 204, the dynamic policy profile 200 provides gateway profile management within the managed infrastructure 100. More specifically, the dynamic policy profile 200 creates rules customized for an environment of one or more of the gateways 108-114 and manages an appropriate connection. Each of the gateways 108-114 is assigned a unique identifier, with the dynamic policy profile 200 supporting wildcards and multiple entries. Each of the gateways 108-114 is deployed with a default profile, and profile update is attempted at start.

Figure 3:
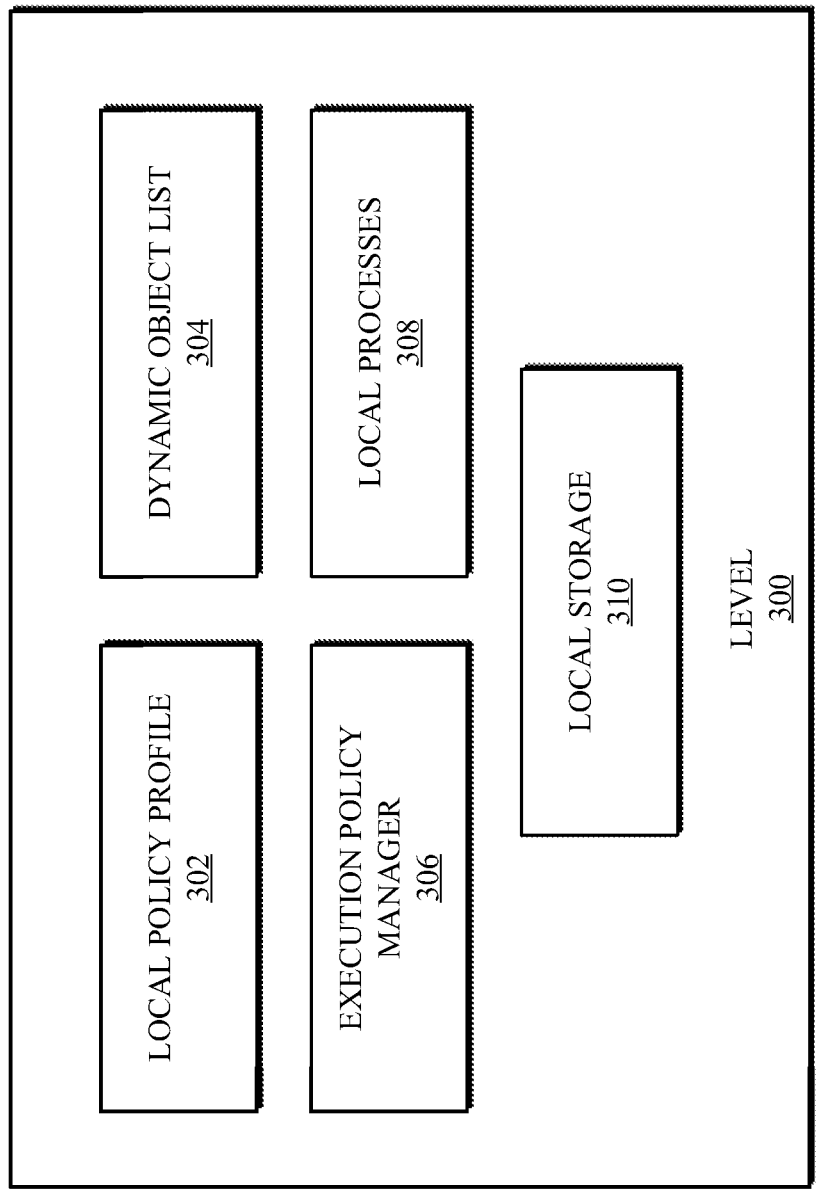
FIG. 3 illustrates an example level within a hierarchical environment executing adjustable data transfer rules and interaction with local applications and processes.

As the gateways 108-114 are enabled within the managed infrastructure 100, the gateways 108-114 will leverage distributed and upgradable data value settings, collection criteria, and response actions. Turning to FIG. 3, an example level 300 within the hierarchical environment of the managed infrastructure 100 executing adjustable data transfer rules and interaction with local applications and processes is illustrated. At the level 300, the dynamic policy profile 200 is published downstream in the managed infrastructure 100 with dynamic data values. A local policy profile 302 is created and synchronized with appropriate hierarchical gateways with secure communications within the managed infrastructure 100. The associated dynamic data values facilitate rapid focusing on appropriate data collection and optimized data handling.

During device operation at the level 300, dynamic events are flagged as a priority level defined by criteria of the local policy profile 302. The criteria of the local policy profile 302 is updatable using the dynamic policy profiles 200 to support changing priorities. The local policy profile 302 may include a priority, a geohash coordinate, an event identification, a start hash, an end hash, and comments. The dynamic policy profiles 200 facilitate collecting high value data, refining training, and mapping new environments, even as the scale of data within the managed infrastructure 100 increases.

In one implementation, the local policy profile 302 provides priority policy management according to a priority level defining reactivity of a response action. For example, the priority may be a high priority, a normal priority, or a low priority. The high priority may correspond to an immediate response, and the low priority may correspond to an opportunistic response (e.g., as possible according to connection, time windows, etc.), with the normal priority corresponding to a response between the high priority and the low priority (e.g., not immediate but soon). Interventions may be assigned a high priority, new dynamic information may be assigned a normal priority, and remapping information may be assigned a low priority level. In one implementation, the priority includes: $P_0$ (transfer immediately); $P_1$ (hold and transfer but do not delete); $P_2$ (hold and transfer over weighed network and deleting is permitted); $P_3$ (hold and transfer at convenience and deleting is permitted); $A_0$ (process immediately); $A_1$ (process as available).

Using the local policy profile 302, a dynamic object list 304 is continually built and maintained. An execution policy manager 306 evaluates all data at the level 300 and executes actions according to the dynamic object list 304. The execution policy manager 306 thus executes actions according to the dynamic policy profile 200, resulting in optimized and appropriate or selective data handling and transfer. Following creation of the local policy profile 302 within the managed infrastructure 100 based on the published dynamic policy profile 200, a data scanner and tagger scans data and assigns priority, and the dynamic object list 304 is created based on established values. The dynamic object list 304 provides an action list that the execution policy manager 306 synchronizes with one or more upstream levels (e.g., upstream gateways) and tags data with transfer success value. The execution policy manager 306 further communicates with local processes 308 and local storage 310 according to the action list to manage the data and facilitate transfer according to the dynamic policy profile 200. The local processes 308 may include data optimization, data anonymization, sensor data validation, real time monitoring, connection profiling, new feature deployment, and/or the like. Following object completion tagging, the dynamic object list 304 is rechecked prior to action to determine whether there were any policy changes impacting the data handling and transfer prior.

Figure 4:
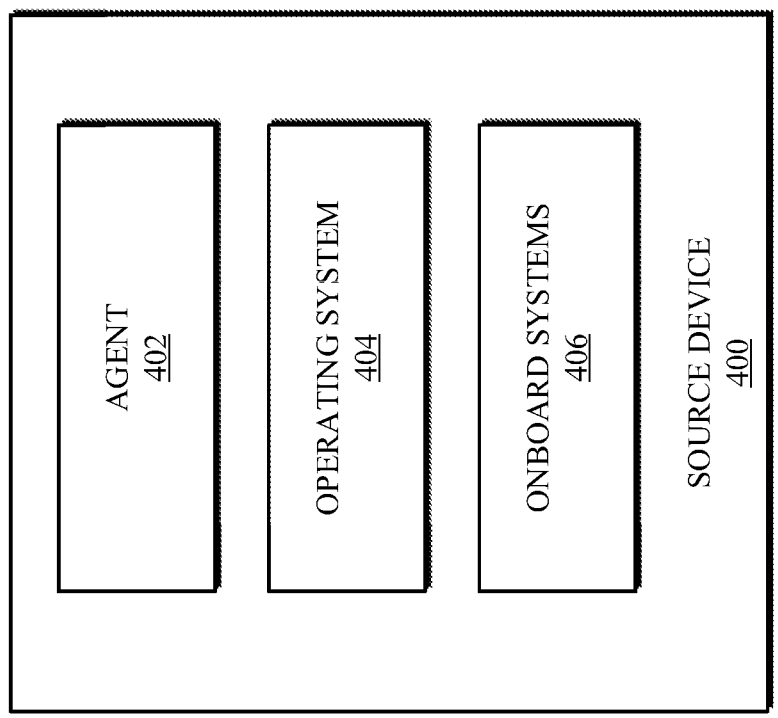
FIG. 4 an example compartmentalized agent for endpoint data management.

The various systems and methods disclosed herein provide for data management within the managed infrastructure 100 including at sources. A source in the managed infrastructure 100 may correspond to endpoints within the infrastructure, such as various types of source devices 400. The source devices 400 may include mobile devices, including user devices (e.g., smartphones, wearables, computers), vehicles, and/or the like. Turning to FIG. 4, an example compartmentalized onboard agent 402 for endpoint data management at the source device 400 is shown. The agent 402 may be one of the gateway agents 108 within the managed infrastructure 100.

In one implementation, the level 300 is an agent level corresponding to the source devices 400. The agent 402 enforces data transfer rules and supports interactions with the local processes 308 as they evolve. The agent 402 leverages an operating system 404 of the source device 400 for chain of trust establishment and maintenance and secure initialization. The operating system 404 may be a real-time operating system (RTOS) processing data with minimized buffering delays. The agent 402 leverages the onboard secure root and support failover features of the operating system 404 to establish end-to-end security within the managed infrastructure 100. Stated differently, all interactions between the agent 402 and the upstream gateway occur with authentication and encryption with redundancy and failover support. The agent 402 further enables caching on the local storage 310 according to one or more resource settings.

The agent 402 enforces data priority values according to the local policy profile 302. In one implementation, the agent 402 initiates connection to an upstream gateway when possible and receives the dynamic policy profile 200 from the upstream gateway for dynamically updating the local policy profile 302. The agent 402 enforces data management and transfer rules and selects functionality of the source device 400 for processing data rather than transferring. In one implementation, the agent 402 obtains, manages, and transfers data captured using one or more onboard systems 406 of the source device 400. The operating system 404 may have a secure connection with the onboard systems 406 to manage and transfer data securely according to the local policy profile 302 and any dynamic updates of the dynamic policy profile 200.

In one implementation, the source device 400 is an autonomous vehicle, and the onboard systems 406 correspond to one or more vehicle systems. Autonomous vehicles are capable of operating to move along a travel path with limited user input. Stated differently, rather than the user being operationally engaged to control the actions of the autonomous vehicle, the user may provide instructions, such as one or more destination points, and the autonomous vehicle transports the user to the selected destination points through a series of autonomous decisions using the vehicle systems. The onboard systems 406 may be associated with autonomy, navigation, perception, and/or the like.

It will be appreciated that the agent 402 may be deployed onboard the source device 400, such as the autonomous vehicle, or may be a data gateway agent appliance integrated into a component associated with the source device 400, such as a charger (e.g., a charger for an electric vehicle), an integrated circuit, subscriber identification module card, or the like. The agent 402 is generally a collection of hardware and software bundled to create a purpose built, closed loop appliance to transmit and receive data from the source device 400 in a localized environment. Within the localized environment, the agent 402 may work with other agent appliances to share workloads in managing data and transmitting the data upstream in the managed infrastructure 100. The closed loop of the agent 402 continues to facilitate data management and communication within the source device 400 when a connection to the managed infrastructure 100 (e.g., a connection to an upstream data gateway) is unavailable. When the agent 402 is deployed onto a component, the agent 402 may communicate with the source device 400 to prompt the source device 400 to handle data according to the dynamic policy profiles 200.

In one implementation, the agent 402 includes onboard storage, direct device networking, upstreaming network, localized compute, resiliency, remote management, and/or the like. The onboard storage includes caching of data generated by the source device 400, firmware, drivers, profiles, and/or the like. The direct device networking may include a wired and/or wireless connection directly to the source device 400, and the upstream networking may similarly include wired and/or wireless (e.g., cellular, satellite, laser, WiFi, Bluetooth, etc.) network connection to upstream services. The localized compute of the agent 402 may involve data extraction, software delivery, edge processing, and/or the like. The resiliency of the agent 402 may be optimized according to size or requirements, and the remote management may be managed upstream within the managed infrastructure 100 when the agent 402 is connected to the network associated with the managed infrastructure 100 (e.g., connected with an upstream data gateway).

Generally, the managed infrastructure 100 applies systemic data values and related priorities at intermediate levels and endpoints in an end-to-end data pipeline. The managed infrastructure 100 intelligently transfers data with an optimized use of networks and storage caches within the hierarchical environment. By managing the entire data pipeline, the rate of high value data ingest within the managed infrastructure 100 increases and proactively reduces low value data transfers. As such, the managed infrastructure 100 facilitates selective, value optimized data ingest and transfer beginning at the source device 400. The dynamic profile policy 200 provides flexible and dynamic data priorities for handling data within the managed infrastructure 100. In one implementation, the profile manager 106 creates and publishes the dynamic policy profile 200 downstream. The profile manager 106 may provide unified management of all the local policy profiles 302 of the gateways 108-114 and associated components. The dynamic policy profile 200 may be used to dynamically adjust the local policy profile 302 and thereby data management rules at the source device 400. The managed infrastructure 100 involves building block gateways that support scaling as the number of the source devices 400 and associated data increases. Stated differently, the data gateways 108-114 may be deployed as building blocks facilitating scaling of the managed infrastructure 100 for data ingesting and handling from the source devise 400 to data destination.

When the source devices 400 are in operation, data is generated quickly with a wide range of values. Portions of this data may have little to no value, particularly for specific tasks. The policy profile manager 106 establishes priorities for capturing, ingesting, and/or transferring high value data starting at the source devices 400. The policy profile manager 106 generates the dynamic policy profile 200 specifying what data is important at a given time and the destination for consuming the data. As such, the managed infrastructure 100 directs data corresponding to a specific task to the destination that needs to consume the data. The dynamic policy profile 200 provides intelligent data handling, including a determination of data value and how and when data should be transferred upstream in the managed infrastructure 100. Similarly, the dynamic policy profile 200 may dictate how and when data, such as a software update or a policy change, is transferred downstream in the managed infrastructure 100. As described herein, the data gateways 108-114 may run in singular or in series within the managed infrastructure 100 to intelligently handle data within the end-to-end pipeline according to data handling policies. The data handling policies may be dynamically updated at one or more levels within the hierarchical environment of the managed infrastructure 100 using the dynamic policy profile 200, which may be configured manually or automatically (e.g., using artificial intelligence). At each level, the associated data gateways use the dynamic policy profile 200 for tagging data for prioritization to optimize what, how, and when the data is sent based on a variety of conditions corresponding to data value, including time, cost, relevance, and/or the like.

In one implementation, one or more of the data gateways 108-114 provide hierarchical data connectivity options (e.g., wired, wireless, etc.), as well as compute resources for processing and caching data locally prior to transfer. The data gateways 108-114 further provide a buffer of the data when a network connection and/or upstream data gateway in the managed infrastructure 100 is unavailable. Overall, the managed infrastructure 100 directs data selectively to the appropriate destinations efficiently, with the dynamic policy profiles 200 dynamically optimizing such data handling rapidly as appropriate conditions, priorities, and needs change.

Using the dynamic policy profiles 200, the managed infrastructure 100 increases a rate of high value data ingest and proactively reduces transfer of low value data. As described herein, appropriately targeted data according to specific tasks may be optimized throughout the managed infrastructure 100 beginning at the source devices 400. The dynamic policy profile 200 flexibly and dynamically assigns priorities to the data at various points of data ingest within the hierarchical environment of the managed infrastructure 100. The policy profile manager 106 may manage the entire end-to-end pipeline of the managed infrastructure 100 to optimize data handling according to specific tasks. Stated differently, the policy profile manager 106 may provide unified management of the hierarchical environment facilitating assignment of specific policy profiles to data gateways within one or more levels, at all levels, at specific data gateways, at specific components, and/or the like. Further, such policy profiles may be adjusted using the dynamic policy profiles 200 from and at any level. More particularly, any upstream component may generate and publish the dynamic policy profiles 200 for publishing to downstream components, such that data handling priorities may be optimized at any level. The managed infrastructure 100 thus publishes the dynamic policy profiles 200 across various levels of the hierarchical environment down to the sources 400, such that each component of the data flow is responsive to prioritized data values.

As described herein, the dynamic policy profiles 200 may be used to facilitate selective data collection beginning at the source devices 400. For example, the source devices 400 may execute one or more operations based on machine learning. The managed infrastructure 100 may include a machine learning training environment that utilizes training datasets to increase accuracy of and otherwise optimize such operations. In one implementation, the managed infrastructure 100 publishes the dynamic policy profiles 200 at the source devices 400 to capture appropriate datasets for the specific task of machine learning.

For example, the policy profile manager 106 may publish the dynamic policy profile 200 at the sources 400 to capture and generate object data associated with a specific object for machine learning training and communicate the object data upstream to a destination according to a priority. The operating system 404 and/or the onboard systems 406 of autonomous vehicles include a perception system for detecting and identifying objects in an environment around the vehicle. The operating system 404 and/or the onboard systems 406 further generate and execute autonomous decisions regarding one or more actions to take in response to the objects. In this example, object data may include sensor data capturing the object and the associated data corresponding to the identification of the object and the autonomous decisions associated with the detection and/or identification of the object.

In cloud computing environments, all data is often obtained altogether for a myriad of objects and parsed at the destination to identify relevant object data for generating training datasets for a specific object. For example, the onboard systems 406 of the source device 400, such as a perception system of an autonomous vehicle, may be configured to identify lampposts as stationary objects to navigate around. However, lampposts exist in a plurality of states, including having various shapes, sizes, colors, and/or the like that may further change depending on environmental conditions, such as light, weather, and location. It may be determined that the perception systems of the source devices 400 should be trained with a particular state of the lampposts, such as lampposts with a shadow. In many typical environments, data, including irrelevant data, is obtained and communicated to a destination for identification of object data corresponding to lampposts with a shadow. This may involve communicating terabytes of data, which may take hours, even with a fast network connection. Conversely, the managed infrastructure 100 publishes the dynamic policy profile 200 at the source devices 400 with specific conditions for capturing and communicating a specific dataset associated with lampposts with a shadow upstream.

In one implementation, the dynamic policy profile 200 sets conditions for a confidence based inference collection of object data for a specific object. For example, the dynamic policy profile 200 may be published at the source device 400 causing the source device 400 to capture object data that the source device 400 identifies as being associated with lampposts with a shadow. Rather than communicate all data, the dynamic policy profile 200 provides selective data ingest, in instances where data communication is appropriate, in the managed infrastructure 100 with the source device 400 communicating the object data according to a priority, reducing low value data transfer and permitting rapid generation of specific training datasets and information based logic for how to more confidently identify and respond to lampposts with a shadow. The information based logic generated using the object data from the source devices 400 may be deployed at the sources devices 400 or abstracted away from the source devices 400 to one or more of the intermediate levels within the hierarchical environment.

As one example, the policy profile manager 106 may generate the dynamic policy profile 200 to focus on lampposts with a shadow including an assigned priority and publish conditions, such as the object, location, date, time, and action. The dynamic policy profile 200 may be published downstream for the source devices 400 to capture the object data associated with the lampposts with shadows and transfer the object data upstream in the managed infrastructure 100 to a destination. The dynamic policy profile 200 may be used to direct the regional data gateway 112 to collect the object data from the source devices 400 and generate the information based logic for identifying and responding to lampposts with shadows. The regional data gateway 112 may then communicate the dynamic policy profile 200 downstream to the edge data gateways 114 and/or to the gateway agents 108 associated with the source devices 400 with the information based logic for identifying and responding to the lampposts with shadows.

As this example illustrates, the dynamic policy profiles 200 ensure that appropriate data collection occurs at the source devices 400, such that capture of large amounts of data, particularly irrelevant data, is avoided and selective data ingests within the managed infrastructure 100 occur. The optimized data collection and ingest results in a significant reduction in overall data handling, while providing flexibility for changing conditions and priorities and enabling precision with scale. The selective collection and communication of object data may be used in a variety of contexts. As another example, the dynamic policy profile 200 may be used to collect object data for maintenance, such as road condition maintenance. Object data identifying potholes, road degradation, debris, and/or the like may be captured at the source device 400 and communicated upstream to the edge data gateway 114 for communication to a road maintenance facility, which may then automatically dispatch or schedule maintenance. As yet another example, the object data may be used to identify a road condition, communicate associated data from the source device 400 upstream to the edge data gateway 114 and/or the regional data gateway 112 for downstream communication to other source devices 400 (e.g., a fleet of vehicles within a region associated with the regional data gateway 112) for rerouting or otherwise addressing the road condition. As still another example, the object data may be used to identify the meaning of content on street signs and respond accordingly. The hierarchical environment may accommodate differences in street signs based on region by deploying policies at the regional data gateway 112. For example, the source devices 400 operating in a state within the United States may prioritize U.S. signage recognition instead of processes for recognizing signage in other world geographies. As such, the dynamic policy profiles 200 may provide dynamic hierarchical rules at appropriate regions and devices within the managed infrastructure 100.

The managed infrastructure 100 may further provide unified management of the source devices 400 to ingest points of the managed infrastructure 100. Networks are often manually defined in a device (e.g., with Boolean connectivity, etc.) with a fixed data selection. The managed infrastructure 100 conversely provides automated profile based management of connections from the source devices 400 to the edge data gateways 114, including caching, data transference, and/or the like. As described herein, the gateway agents 108 are the first level of the hierarchical environment of the managed infrastructure 100. Based on the dynamic policy profiles 200, the gateway agents 108 may dictate where, when, and how data is communicated upstream to the edge data gateways 114 from the source devices 400.

In one implementation, when the source devices 400 move from region to region, there may be different policies for capturing and communicating different types of information upstream, so the regional data gateways 112 may provide regional specific policies to the source devices 400 for application upon entering a corresponding region. Commonly, data is communicated from devices to a cloud with rules for handling data being cloud oriented for processing the data. Conversely, the managed infrastructure 100 provides ingests of data according to user preferences, specific tasks, regulatory compliance, and/or the like within appropriate regional contexts. Using location information for the source devices 400 and/or through communication with the regional data gateway 112 via the edge data gateway 114, the source devices 400 may obtain and enforce regional or other data ingest policies published downstream from the regional data gateway 112. Stated differently, regional decisions correspond to the location of each of the source devices 400, such that each source device 400 captures, communicates, and handles data based on the region in which the source device 400 is located.

Data communication policies may vary regarding device to device interaction, including security, features, and/or the like. For example, the dynamic policy profile 200 may be used to specify and execute user preferences for a communication policy between a first source device, such as an autonomous vehicle, and a second source device, such as a smartphone, for a family. Parents may authenticate the second source device to securely obtain data, under appropriate circumstances, from the first source device to monitor a location or other information about their children via the managed infrastructure 100, while preventing that data from being transferred upstream or to other devices.

Similarly, different regions may have varying regulatory policies for data ingest. The regional data gateway 112 may publish the dynamic policy profile 200 downstream to the source devices 400 within the associated region, with the dynamic policy profile 200 specifying the regulatory policy for data ingest within the region. For example, a particular region may include a regulatory policy about toll information. More specifically, the particular region may be a toll road, such that when the source device 400 moves onto the toll road, toll information (e.g., a profile with a toll agency) is sent upstream for communication to the toll agency.

As another example, data communication and handling of data often involves a cost that varies depending on the network. Sending data via a network owned by mobile service provider may have a higher cost than sending data via another wireless network connection type (e.g., WiFi). Additionally, sending data from a particular location or during a particular time may involve communicating the data across multiple carrier networks, with varying associated costs associated with each carrier network. Similarly, a particular carrier may have a higher cost for sending data during a particular time window. The dynamic policy profile 200 deployed at the global data gateway 110 may specify criteria for what type of data to communicate when and how. For example, data assigned a lower priority may be cached until a low cost connection type (e.g., wireless versus cellular network, outside higher cost time windows, a particular carrier network is available, etc.) is available, while data assigned a high priority is communicated regardless of the connection type. The dynamic policy profile 200 may further be deployed at the regional data gateway 112 according to the connection types available in a particular region. For example, one region may have a free public wireless network deployed in light posts along a highway, where data is ingested via the free public wireless network regardless of priority within the region. Generally, the dynamic policy profiles 200 within the managed infrastructure 100 may be used to identify connection options, prioritize rules for infrastructure ingest points (e.g., complex networking, security, authentication, etc.), and publish conditions (e.g., object, location, date, time, and action) downstream.

The managed infrastructure 100 may further provide prioritized transfers via selected transfer mediums according to the dynamic policy profiles 200. Edge devices, such as Internet of Things (IoT) devices typically pass data without process for validation in the cloud. Conversely, the managed infrastructure 100 has various services running at an appropriate level within the hierarchical environment, thereby providing appropriate data management at each point in the end-to-end data pipeline. Such gateway management starts at the source devices 400 and continues throughout the pipeline with analysis and real time decision making for optimal cost, value, and speed of data transfers.

Additionally, historical data, including network availability and usage, showing how and when data has been transferred, along with underlying decisions, may be tracked at various stages within the hierarchical environment of the managed infrastructure 100 to facilitate historical analysis of data transfers for continuous optimization within an entirety of the end-to-end data pipeline. The data management specified using the dynamic policy profiles 200 may support region specific requirements and prioritize transfers via selected transfer mediums based on estimated transfer time and cost, relative caching and/or storage capability, pipeline and service protection, and/or the like. For example, data may be transferred via selected transfer mediums based on one or more services running at different levels within the hierarchical environment of the managed infrastructure 100. The services may include, without limitation, monitoring, configuring, data stream processing, historical analysis, caching intelligence, bad actor detection, distributed denial-of-service (DDoS) resilience, encryption, authorization, authentication, messaging protocol, and/or the like.

The managed infrastructure 100 may further provide rapid modification of data management based on source requirements. Many devices, such as autonomous vehicles, often need firmware updates with the vehicle being turned off to apply regulation changes or other updates. Conversely, the managed infrastructure 100 uses the dynamic policy profiles 200 to rapidly change policies for data management at the source devices 400. Such rapid deployments permit compliance to policies, associated with regulations, standards, preferences, and/or the like, prior to the data leaving the source devices 400, as well as at each stage of the hierarchical environment of the managed infrastructure 100. Stated differently, the dynamic policy profiles 200 may be used to restrict non-compliant data transfers according to granular settings for various contexts, such as regional contexts, regulatory contexts, business contexts, and/or the like.

As an example of a regional and/or regulatory context, a road may be closed for construction or according to a city ordinance. Using the dynamic policy profile 200 may be rapidly deployed to instruct the source devices 400 (e.g., a fleet of vehicles within an associated region) to route around the closed road. The dynamic policy profile 200 may be generated in response to receipt of a notification of the closed road from a third party, such as a construction company or a regulatory agency (e.g., in connection with a city ordinance), or based on a geofence generated by one of the source devices 400. One of the source devices 400 may identify the closed road, generate the geofence around the closed road, and communicate the geofence upstream for generating the dynamic policy profile 200 for the regional data gateway 112 to broadcast to the source devices 400 within a region associated with the closed road. As such, traffic may be efficiently routed around the closed road via automation.

Additionally, software and other updates may be rapidly deployed at the source devices 400 without firmware updates or requiring the source devices 400 to be off or otherwise not in use. Such rapid deployment of software and updates facilitates different software and protocols to be deployed and changed according to region as the source devices 400 move between regions as well as real time updates according to changing conditions. The managed infrastructure 100 further permits edge analysis of data for example with time or region based rules for actions and data handling. In one implementation, the dynamic policy profile 200 specifies an update, assigns a prioritized rule (e.g., push new inference conditions), and publishes conditions (e.g., object, location, date, time, action, etc.) downstream.

The managed infrastructure 100 may further use the dynamic policy profile 200 for new feature validation. Conventionally, many businesses providing devices will deploy new features in an update following testing in a testing environment and adjust the features in a subsequent update according to operation in the field. However, while a testing environment may be limited in various ways, deployment of new features on some devices, such as autonomous vehicles, is generally not practical. Accordingly, the managed infrastructure 100 may utilize the dynamic policy profiles 200 to test new features in the field without actually deploying the new features.

More particularly, in one implementation, users associated with the source devices 400 may provide an informed authorization to participate in a test fleet for a dry run of new features. The managed infrastructure 100 thus facilitates users ability to "opt in" and "opt out" of participation, as desired by users. The dynamic policy profile 200 provides a dry run feature, prioritized conditional data, and publish conditions (e.g., object, location, date, time, action, etc.) to the source devices 400 of the test fleet. The new feature is deployed at the source devices 400 of the test fleet as a background feature that does not affect the operating system 404, the onboard systems 406, the known state of autonomy, and/or other aspects of the source devices 400. Instead, the new feature runs in the background and captures feature validation data associated with the new feature.

Upon detection of an event associated with the new feature, the source device 400 may capture sensor data associated with the event and decision data corresponding to decisions, including any actions, the source device 400 would have generated and executed in response to detection of the event, while the source device 400 continues to actually respond to the event according to its current protocols. The feature validation data, including the sensor data, the decision data, and/or the like, is communicated upstream according to the dynamic policy profile 200 for analysis and optimization of the new feature. As such, the dynamic policy profiles 200 of the managed infrastructure 100 provide a new feature framework for conducting a dry run of new features that may replace defined behavior, while supporting testing logic changes, new conditions, sensor changes, and/or other feature evaluations. The dynamic policy profile 200 may assign high priority values to the feature validation data to provide rapid feedback regarding the new features for optimization.

Overall, the managed infrastructure 100 provides managed, dynamic, scaled data ingest from a myriad of endpoints. With data generation outpacing capacity, the managed infrastructure 100 evaluates and handles data based on data value and priority. The managed infrastructure 100 provides selective, value optimized data transfer beginning at the source devices 400, while ensuring dynamic data priorities with the ability to adjust data handling at the source devices 400 prior to transfer upstream according to changing conditions. The policy profile manager 106 may provide a unified management of the data gateways 108-114 across the levels of the hierarchical environment from end-to-end. The hierarchical environment of the managed infrastructure 100 facilitates building block scaling of gateways including the onboard gateway agent 402.

Various examples of data handling using the dynamic policy profiles 200 within the managed infrastructure 100 have been described herein. It will be appreciated that these example are exemplary only and non-limiting. The dynamic policy profiles 200 may be used to capture, evaluate, handle, and deploy data upstream and downstream within the managed infrastructure 100. The managed infrastructure 100 may provide: bidirectional validation of data interaction (i.e., both ingesting and deployment); updatable onboard data priorities; unified management of gateways across the hierarchical environment; unified management of data value and priority rules; creation of early data collection building focused working sets for machine learning and other purposes; near real time regulatory and other policy adherence; static mapping data updating for frequently traveled areas with data value decreased to reduce redundant data; capture of data for statistical study involving a conditional query run on all endpoints; and/or the like. It will be appreciated that the dynamic policy profiles 200 and aspects of the managed infrastructure 100 may be applied to various scenarios and contexts.

Figure 5:
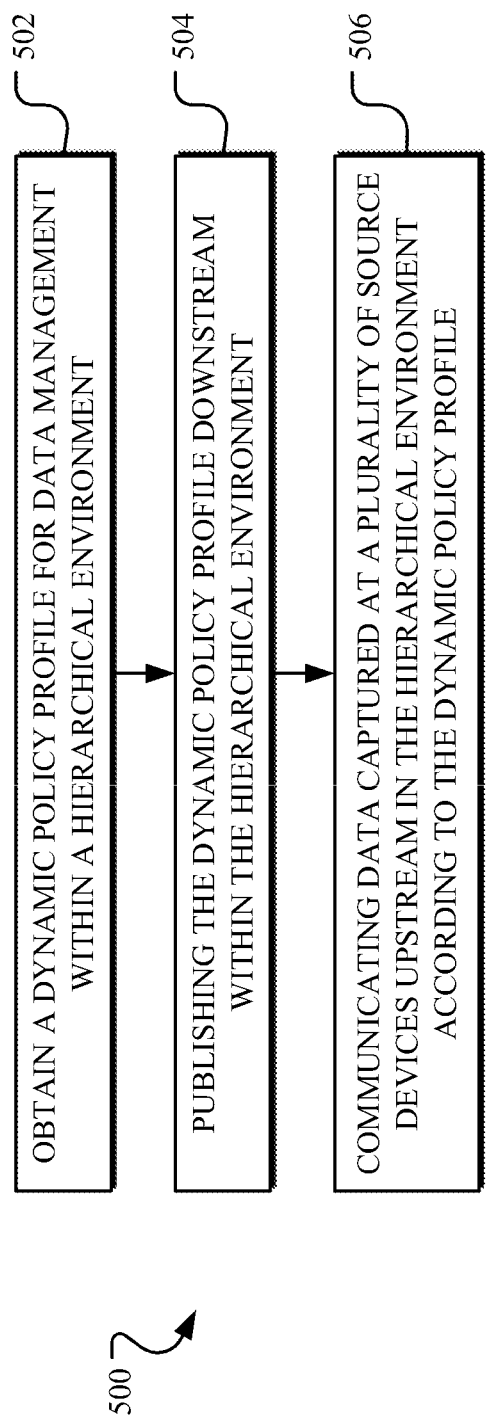
FIG. 5 illustrates example operations for data management for a plurality of source devices.

Referring to FIG. 5, example operations 500 for data management for a plurality of source devices are illustrated. In one implementation, an operation 502 obtains a dynamic policy profile for data management in a hierarchical environment associated with the plurality of source devices. The dynamic policy profile includes an action and a priority level. The plurality of source devices may include, without limitation, mobile devices, a fleet of vehicles (e.g., autonomous vehicles), and/or the like. The hierarchical environment may be deployed within a managed infrastructure associated with a plurality of levels of an end-to-end data pipeline including at least one policy profile manager at an upstream end of the hierarchical environment and a plurality of agents associated with the plurality of source devices at a downstream end of the hierarchical environment. The hierarchical environment may further include one or more intermediate levels between the upstream end and the downstream end. One or more of the levels in the hierarchical environment may be associated with one or more data gateways. For example, the intermediate levels may include a regional level with a plurality of regional data gateways, each corresponding to a different geographical region.

An operation 504 publishes the dynamic policy profile downstream in the hierarchical environment. In one implementation, the dynamic policy profile is generated by at least one policy profile manager and published downstream from the policy profile managers in the hierarchical environment to one or more levels. For example, the dynamic policy profile may be published downstream to an intermediate level and/or published downstream from the intermediate level to one or more of the source devices. The policy profile manager(s) may be configured to instruct a source device to adjust the action or the priority level of the dynamic policy profile.

The dynamic policy profile is deployed at a level in the hierarchical environment, and an operation 506 communicates data upstream from the level in the hierarchical environment according to the action and the priority level of the dynamic policy profile. For example, the dynamic policy profile may be deployed at the plurality of source devices, and data may be communicated upstream from the plurality of source devices in the hierarchical environment according to the action and the priority of the dynamic policy profile.

In one implementation, the action of the dynamic policy profile specifies a type of data and how to handle the data, with the priority level specifying a reactivity of when to take the action. For example, the action may indicate whether a source device captures data regarding an object (e.g., an object located along a travel path of a vehicle). The action may further specify whether the data regarding the object is communicated from the source device upstream in the hierarchical environment. The priority level associated with the action may specify a timing of when the data regarding the object is communicated from the source device upstream in the hierarchical environment. Similarly, the priority level may further indicate a timing of when any intermediate levels in the hierarchical environment communicate the data regarding the object upstream.

The dynamic policy profile may correspond to a target object. In one implementation, the source devices determine whether to communicate data regarding objects upstream by identifying of an object in the data as the target object. Data corresponding to the target object may be extracted from object data captured by the source device(s) and communicated upstream according to the dynamic policy profile. Upstream, for example at an intermediate level, a training set for the target object may be generated using the data. Object recognition or other information based logic may be generated using the training set and published downstream using a dynamic policy profile to update behavior and data handling regarding the target object.

In another example, the action of the dynamic policy profile corresponds to a selective data ingest using one or more particular communication modalities to communicate data, and the priority level of the dynamic policy profile defines when to use the particular communication modalities. The dynamic policy profile may involve a specific data ingest based on one or more of a communication window, a communication cost, a connection type, regulatory compliance, device interaction, regional policy, user preference, and/or the like.

The dynamic policy profile may correspond to data management at one or more levels in the hierarchical environment. For example, data communicated upstream from the level in the hierarchical environment may be based on one or more services running at the level. The services may include, without limitation, monitoring, configuring, data stream processing, historical analysis, caching intelligence, bad actor detection, DDoS resilience, encryption, authorization, authentication, messaging protocol, data transfer type, data transfer medium, and/or the like. In another example, the dynamic policy profile may correspond to source data management at the source devices. An agent deployed at a source device applies a data standard prior to data being communicated from the source device upstream in the hierarchical environment. As such, data is managed at the source devices prior to transfer.

The dynamic policy profile may be associated with a dynamic update that updates at least one operation of the source device. On the other hand, the dynamic policy profile may correspond to new feature validation in the plurality of source devices. Data communicated upstream in the hierarchical environment may include validation data captured by the source devices for the new feature validation. The dynamic policy profile may include a payload of code related to a new feature, such as autonomy, sensing, and/or the like. The source device runs existing code and the payload of code simultaneously and captures a first dataset associated with the existing code and a second dataset associated with the payload of code. The payload of code runs in the background, such that the source devices executes the existing code and the payload of code is not executed. For example, autonomy decisions of the source device may be generated and executed based on the existing code, with the payload of code not impacting the autonomy decisions. One or both of the first dataset and the second dataset may be communicated upstream as the validation data.

Figure 6:
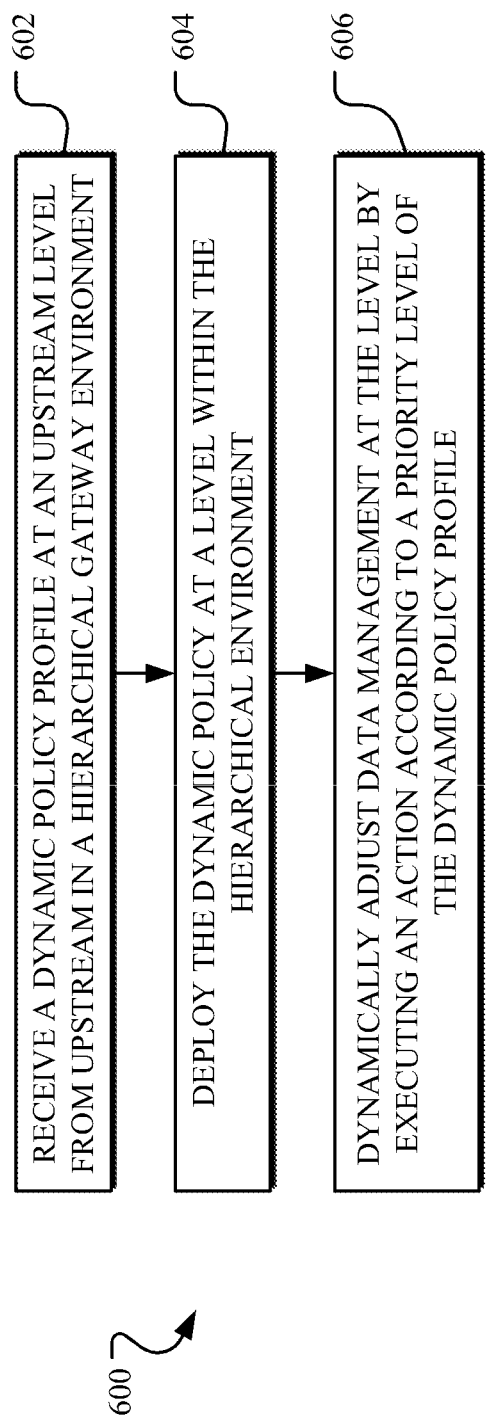
FIG. 6 illustrates example operations for data management within a hierarchical environment.

Referring to FIG. 6, example operations 600 for data management within a hierarchical environment are illustrated. In one implementation, an operation 602 receives a dynamic policy profile at a level from upstream in a hierarchical environment. The dynamic policy profile may be generated by a policy profile manager deployed in the hierarchical environment that is configured to manage end-to-end data transfer within the hierarchical environment. In one implementation, the dynamic policy profile is published downstream from the policy profile manager in the hierarchical environment. The dynamic policy profile may include an action and a priority level. An operation 604 deploys the dynamic policy profile at the level, and an operation 606 dynamically adjusts data management at the level by executing the action according to the priority level.

Figure 7:
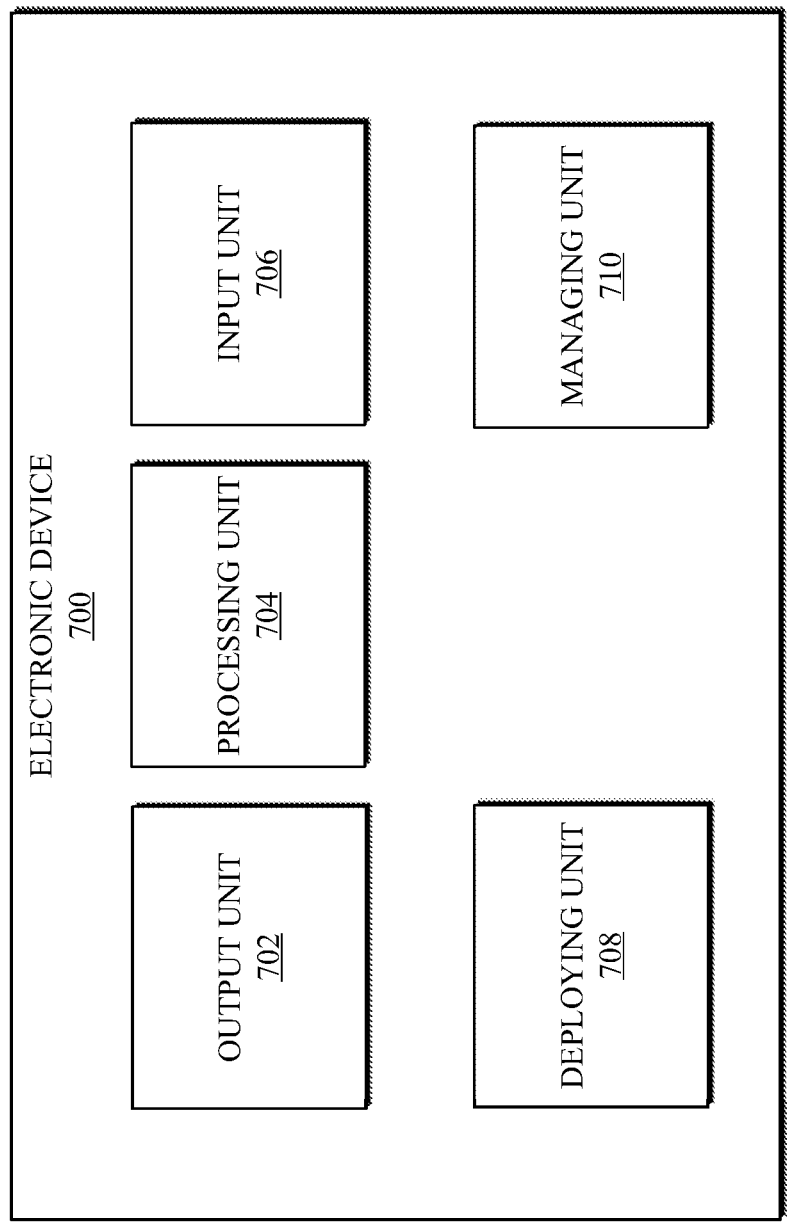
FIG. 7 is a functional block diagram of an electronic device including operational units arranged to perform various operations of the presently disclosed technology.

Turning to FIG. 7, an electronic device 700 including operational units 702-712 arranged to perform various operations of the presently disclosed technology is shown. The operational units 702-710 of the device 700 are implemented by hardware or a combination of hardware and software to carry out the principles of the present disclosure. It will be understood by persons of skill in the art that the operational units 702-710 described in FIG. 7 may be combined or separated into sub-blocks to implement the principles of the present disclosure. Therefore, the description herein supports any possible combination or separation or further definition of the operational units 702-710.

In one implementation, the electronic device 700 includes a display unit 702 configured to display information, such as a graphical user interface, and a processing unit 704 in communication with the display unit 702 and an input unit 706 configured to receive data from one or more input devices or systems. Various operations described herein may be implemented by the processing unit 704 using data received by the input unit 706 to output information for display using the display unit 702. Additionally, in one implementation, the electronic device 700 includes units implementing the operations described with respect to FIG. 6. For example, the operation 602 may be implemented by the input unit 706, the operation 604 may be implemented by a deploying unit 708, and the operation 606 may be implemented by a managing unit 710.

Figure 8:
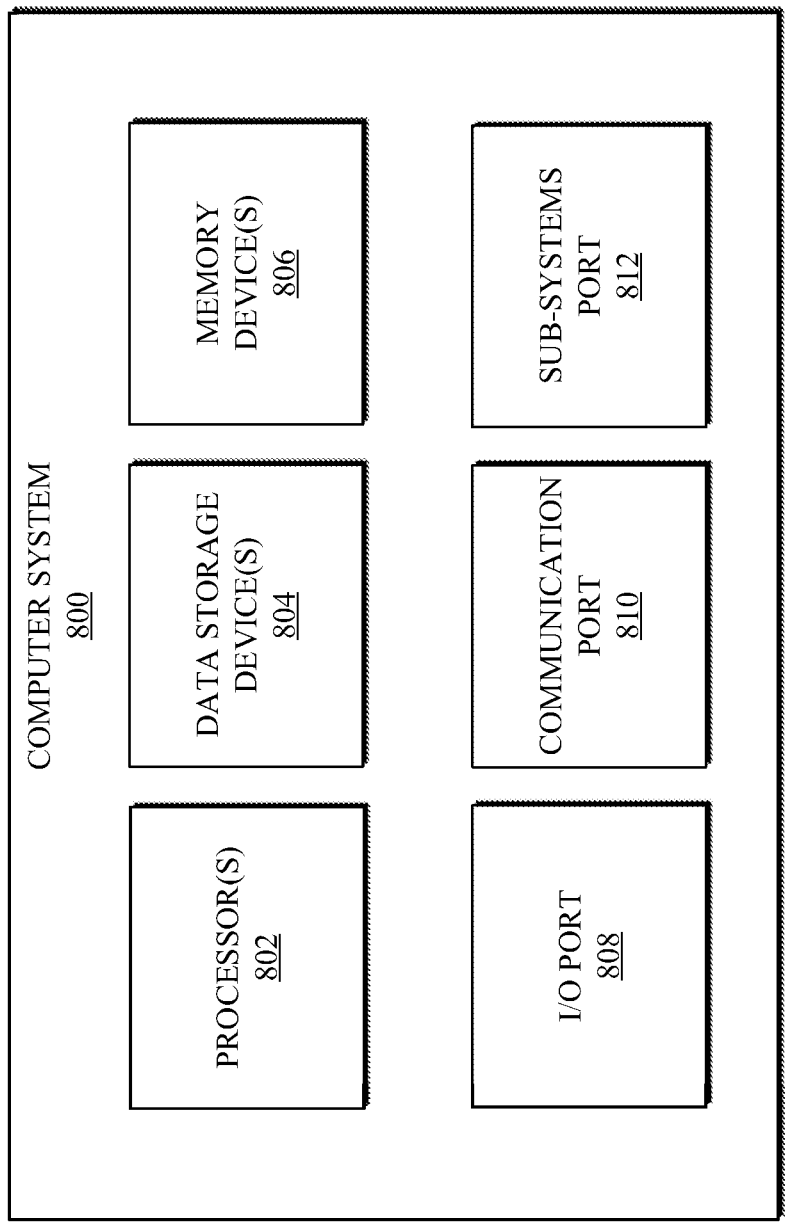
FIG. 8 is an example computing system that may implement various aspects of the presently disclosed technology.

Referring to FIG. 8, a detailed description of an example computing system 800 having one or more computing units that may implement various systems and methods discussed herein is provided. The computing system 800 may be applicable to the measuring system 102 and other computing or network devices. It will be appreciated that specific implementations of these devices may be of differing possible specific computing architectures not all of which are specifically discussed herein but will be understood by those of ordinary skill in the art.

The computer system 800 may be a computing system is capable of executing a computer program product to execute a computer process. Data and program files may be input to the computer system 800, which reads the files and executes the programs therein. Some of the elements of the computer system 800 are shown in FIG. 8, including one or more hardware processors 802, one or more data storage devices 804, one or more memory devices 808, and/or one or more ports 808-812. Additionally, other elements that will be recognized by those skilled in the art may be included in the computing system 800 but are not explicitly depicted in FIG. 8 or discussed further herein. Various elements of the computer system 800 may communicate with one another by way of one or more communication buses, point-to-point communication paths, or other communication means not explicitly depicted in FIG. 8.

The processor 802 may include, for example, a central processing unit (CPU), a microprocessor, a microcontroller, a digital signal processor (DSP), and/or one or more internal levels of cache. There may be one or more processors 802, such that the processor 802 comprises a single central-processing unit, or a plurality of processing units capable of executing instructions and performing operations in parallel with each other, commonly referred to as a parallel processing environment.

The computer system 800 may be a conventional computer, a distributed computer, or any other type of computer, such as one or more external computers made available via a cloud computing architecture. The presently described technology is optionally implemented in software stored on the data storage device(s) 804, stored on the memory device (s) 806, and/or communicated via one or more of the ports 808-812, thereby transforming the computer system 800 in FIG. 8 to a special purpose machine for implementing the operations described herein. Examples of the computer system 800 include personal computers, terminals, workstations, mobile phones, tablets, laptops, personal computers, multimedia consoles, gaming consoles, set top boxes, and the like.

The one or more data storage devices 804 may include any non-volatile data storage device capable of storing data generated or employed within the computing system 800, such as computer executable instructions for performing a computer process, which may include instructions of both application programs and an operating system (OS) that manages the various components of the computing system 800. The data storage devices 804 may include, without limitation, magnetic disk drives, optical disk drives, solid state drives (SSDs), flash drives, and the like. The data storage devices 804 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 806 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 804 and/or the memory devices 806, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 800 includes one or more ports, such as an input/output (I/O) port 808, a communication port 810, and a sub-systems port 812, for communicating with other computing, network, or vehicle devices. It will be appreciated that the ports 808-812 may be combined or separate and that more or fewer ports may be included in the computer system 800.

The I/O port 808 may be connected to an I/O device, or other device, by which information is input to or output from the computing system 800. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 800 via the I/O port 808. Similarly, the output devices may convert electrical signals received from computing system 800 via the I/O port 808 into signals that may be sensed as output by a human, such as sound, light, and/or touch. The input device may be an alphanumeric input device, including alphanumeric and other keys for communicating information and/or command selections to the processor 802 via the I/O port 808. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 800 via the I/O port 808. For example, an electrical signal generated within the computing system 800 may be converted to another type of signal, and/or vice-versa. In one implementation, the environment transducer devices sense characteristics or aspects of an environment local to or remote from the computing device 800, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 800, such as, physical movement of some object (e.g., a mechanical actuator), heating or cooling of a substance, adding a chemical substance, and/or the like.

In one implementation, a communication port 810 is connected to a network by way of which the computer system 800 may receive network data useful in executing the methods and systems set out herein as well as transmitting information and network configuration changes determined thereby. Stated differently, the communication port 810 connects the computer system 800 to one or more communication interface devices configured to transmit and/or receive information between the computing system 800 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 810 to communicate one or more other machines, either directly over a point-to-point communication path, over a wide area network (WAN) (e.g., the Internet), over a local area network (LAN), over a cellular network, satellite network, millimeter wave network, laser network, or over another communication means. Further, the communication port 810 may communicate with an antenna for electromagnetic signal transmission and/or reception. In some examples, an antenna may be employed to receive Global Positioning System (GPS) data to facilitate determination of a location of a machine, vehicle, or another device.

The computer system 800 may include a sub-systems port 812 for communicating with one or more systems related to a vehicle to control an operation of the vehicle and/or exchange information between the computer system 800 and one or more sub-systems of the vehicle. Examples of such sub-systems of a vehicle, include, without limitation, imaging systems, radar, LIDAR, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, dynamic policy profiles, software, data, and/or the like may be embodied by instructions stored on the data storage devices 804 and/or the memory devices 806 and executed by the processor 802. The computer system 800 may be integrated with or otherwise form part of a vehicle or other network components of the managed infrastructure 100. In some instances, the computer system 800 is a portable device that may be in communication and working in conjunction with various systems or sub-systems of a vehicle.

The present disclosure recognizes that the selective ingest and processing of data improves the scalability of data management systems. It is recognized that data ingestion and use of ingested data should be performed in a privacy-respectful manner. Implementers of the present technology should consider allowing users to "opt in" or "opt out" of participation in the collection of sensitive information.

Entities responsible for the collection, analysis, disclosure, transfer, storage, or other use of such data, particularly data considered to be of a personal nature, should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices. A system incorporating the present technologies can include hardware and/or software for safely handling the information.

The system set forth in FIG. 8 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for vehicle data management for a fleet of vehicles, the method comprising:
    obtaining a policy profile for data management in a hierarchical environment associated with the fleet of vehicles, the policy profile including an action and a priority level;
    publishing the policy profile downstream in the hierarchical environment, the policy profile deployed at one or more vehicles of the fleet of vehicles using one or more agents of the hierarchical environment, wherein each of the agents is deployed in at least one of the one or more vehicles or one or more components associated with the one or more vehicles; and
    communicating data from the one or more vehicles upstream in the hierarchical environment according to the action and the priority level of the policy profile.

2. The method of claim 1, wherein the policy profile corresponds to a target object and the data includes object data corresponding to the target object, the action specifying whether to capture the object data corresponding to the target object.

3. The method of claim 2, wherein the action further specifies whether to communicate the object data upstream in the hierarchical environment, and the priority level includes a timing of when the data is communicated upstream in the hierarchical environment from the one or more vehicles.

4. The method of claim 1, wherein the action specifies whether and how the data is communicated upstream in the hierarchical environment from the one or more vehicles and the priority level specifies when the data is communicated upstream in the hierarchical environment from the one or more vehicles.

5. The method of claim 1, wherein the policy profile is further deployed at one or more intermediate levels in the hierarchical environment, the action specifying whether and how the data is communicated upstream in the hierarchical environment from the one or more intermediate levels, the priority level specifying when the data is communicated upstream in the hierarchical environment from the one or more intermediate levels.

6. The method of claim 1, wherein the policy profile is generated by a policy profile manager and published downstream from the policy profile manager in the hierarchical environment.

7. The method of claim 6, wherein the policy profile is published downstream from the policy profile manager to an intermediate level within the hierarchical environment and published downstream from the intermediate level to the one or more vehicles.

8. The method of claim 1, wherein the hierarchical environment includes one or more intermediate levels upstream from the fleet of vehicles, the one or more intermediate levels including a regional level associated with a plurality of geographical regions in which the fleet of vehicles operate.

9. The method of claim 8, wherein the plurality of geographical regions includes a first geographical region and a second geographical region, the first geographical region communicating the data upstream in the hierarchical environment according to the action and the priority level and the second geographical region communicating the data upstream in the hierarchical environment according to at least one of a different action or a different priority level.

10. The method of claim 1, wherein the action specifies whether and how to use one or more particular communication modalities to communicate the data upstream in the hierarchical environment, and the priority level specifies when to communicate the data upstream in the hierarchical environment.

11. The method of claim 1, wherein the policy profile is associated with a dynamic update updating at least one operation of the one or more vehicles.

12. The method of claim 1, wherein the one or more vehicles are operating pursuant to existing code, the policy profile including a payload of code corresponding to a new feature for background execution at the one or more vehicles, the one or more vehicles continuing to operate pursuant to the existing code without impact by the payload of code, the data communicated upstream in the hierarchical environment corresponding to validation of the new feature.

13. The method of claim 1, wherein the one or more components includes a charger.

14. A system for data management for a fleet of vehicles, the system comprising:

a policy profile manager comprising memory and at least one processor configured to manage end-to-end data transfer within a hierarchical environment, the policy profile manager being associated with a first level in the hierarchical environment, the policy profile manager generating a dynamic policy profile including an action and a priority level, the dynamic policy profile being published downstream in the hierarchical environment; and an agent associated with a vehicle in the fleet of vehicles, the agent being associated with a second level in the hierarchical environment downstream from the first level, the dynamic policy profile deployed at the agent and dynamically adjusting at least one operation of the vehicle based on the action and the priority level.

15. The system of claim 14, wherein the at least one operation of the vehicle includes one or more of data transfer, autonomy, vehicle control, perception, navigation, motion planning, and user preference.

16. The system of claim 14, wherein the second level is a first upload level and a final download level in the hierarchical environment.

17. The system of claim 14, wherein the action specifies an application of a data standard prior to data being communicated from the agent upstream in the hierarchical environment.

18. One or more tangible non-transitory computer-readable storage media storing computer-executable instructions for performing a computer process on a computing system, the computer process comprising:

receiving a dynamic policy profile at a first level from a second level upstream in a hierarchical environment, the hierarchical environment including one or more intermediate levels upstream from the first level and downstream from the second level, the one or more intermediate levels including a regional level associated with one or more geographical regions, the dynamic policy profile published downstream from the second level in the hierarchical environment, the dynamic policy profile including an action and a priority level;

deploying the dynamic policy at a level in the hierarchical environment; and dynamically adjusting data management at the level in the hierarchical environment by executing the action according to the priority level.

19. The one or more tangible non-transitory computer-readable storage media of claim 18, wherein the dynamic policy profile is associated with a dynamic update updating at least one operation of one or more vehicles.

20. The one or more tangible non-transitory computer-readable storage media of claim 18, wherein one or more devices operate in the one or more geographical regions.

* * * * *